Feb. 21, 1967 W. S. CLOUD, JR 3,304,843
MANUFACTURE OF PLASTIC PACKAGES
Filed Oct. 18, 1963
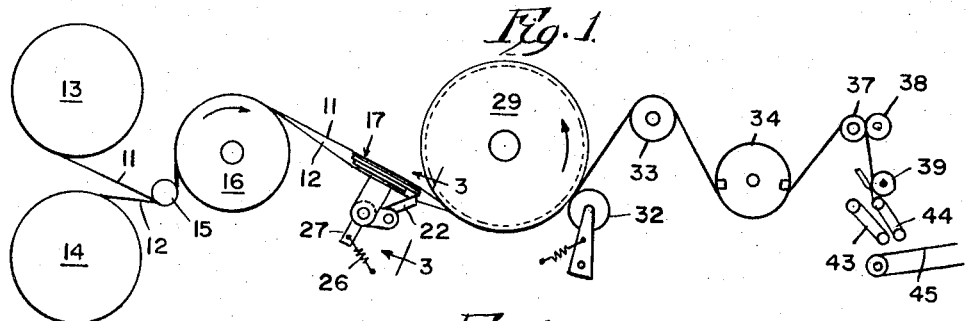
*Fig. 1.*
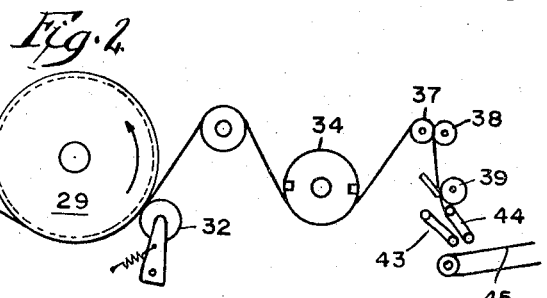
*Fig. 2.*
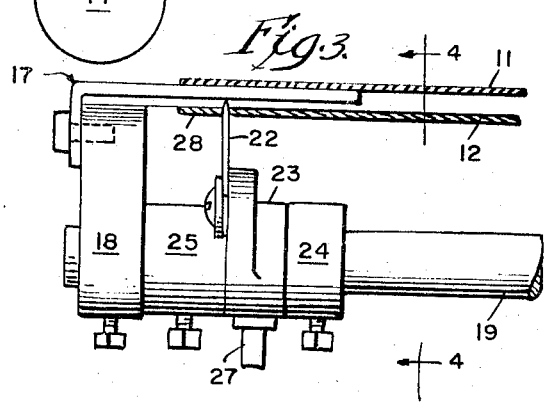
*Fig. 3.*
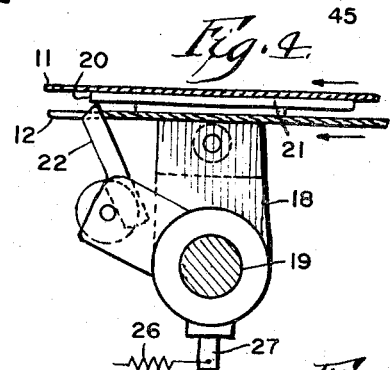
*Fig. 4.*
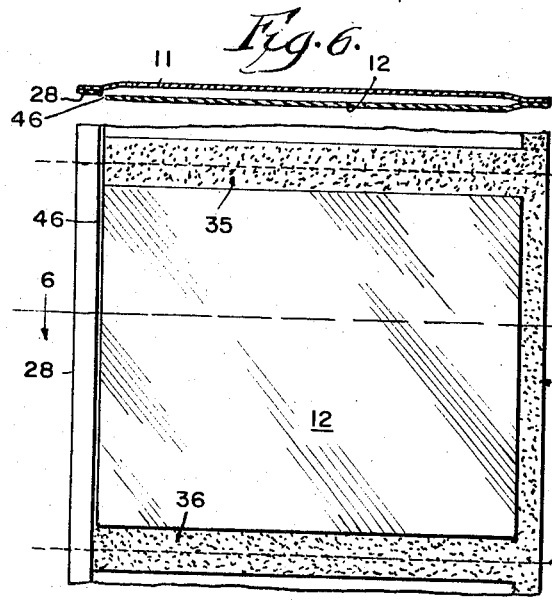
*Fig. 6.*
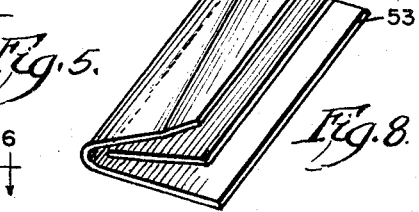
*Fig. 7.*
*Fig. 5.*
*Fig. 8.*
Inventor.
William S. Cloud Jr.
By Frank J. Foley
Attorney.

3,304,843
MANUFACTURE OF PLASTIC PACKAGES
William S. Cloud, Jr., 315 Pebblebrook Road,
Northbrook, Ill. 60062
Filed Oct. 18, 1963, Ser. No. 317,325
6 Claims. (Cl. 93—8)

This invention relates to improvements in containers, pouches or packages made from sheet material such as plastic sheets, metal foil and laminated sheets of various suitable materials, and in methods and apparatus for producing the containers.

To simplify the description of the methods and the apparatus of this invention, the description will first be directed to the use of heat-sealable plastic sheet material.

For certain commercial uses, plastic containers have recently been delivered to the point of ultimate use with one edge open for the insertion of the materials or product to be packaged. Usually, such as package has been formed from two sheets of plastic material, whether laminated or not, which are heat sealed along three marginal portions of a rectangular package, the fourth side not being sealed, thus providing as an opening the unmodified edges of the two sheets in exact registration with each other.

To open such an edge opening, preparatory to inserting the product, it has been a common practice to blow a stream of air toward the two sheet edges to separate one from the other. This practice has not been uniformly successful, because the sheet edges are often very thin and very flexible, and frequently one edge will not separate from the other. In a fast moving production line such failures interfere with the package filling operations.

I have discovered that such failures can be eliminated by forming on the edge portion of one of the sheets, at the open edge, a double layer of the sheet material, leaving the edge of the other sheet at its original thickness. Thereafter, when a stream of air is projected at such an improved opening, the un-reinforced edge only will readily be engaged by the air stream and be separated from the reinforced edge, thereby allowing the package to be partially inflated, after which the product filling operation may then proceed.

This method of reinforcement of one sheet at the open edge of the package can be accomplished during manufacture of the package by equipment and methods which blend readily into package manufacturing procedures. The same methods are applicable if each sheet carries one or more sheets laminated thereto.

The general object of this invention is to provide a plastic package with a filling opening along or near one edge thereof, formed by or defined by the edges of two plastic sheets, the edge of one sheet being reinforced by the addition thereto of a strip of the same material sealed thereto.

Another object of this invention is to provide improved methods of forming a package from plastic sheet material, and forming a filling opening along a marginal portion of the package with one edge of the opening reinforced by a heat-sealed strip of the same material.

Another object of the invention is to provide apparatus for manufacturing plastic containers having the foregoing described features and in accordance with said methods.

Other objects of the invention will become apparent in the following specification, or will be mentioned hereinafter.

In the drawing two forms of the invention will be shown.

FIGURE 1 is a diagrammatic view of the principal parts of one form of the apparatus to be employed.

FIGURE 2 is a diagrammatic view of another arrangement of the apparatus.

FIGURE 3 is a view taken from the line 3—3 of FIGURE 1.

FIGURE 4 is a view taken from the line 4—4 of FIGURE 3.

FIGURE 5 is a fragmentary elevational view of a package, with the slitted filler opening, completed by the heat sealers, and just before it is cut from adjacent packages.

FIGURE 6 is a sectional view on the line 6—6 of FIGURE 5.

FIGURE 7 is a sectional detail view showing a modified method of forming a reinforced edge at a filler opening.

FIGURE 8 is a detail view in perspective of a conventional sheet folding element used to obtain the folding effect shown in FIGURE 7.

Referring further to the drawing, FIGURES 1 and 2 show only the principal parts of the apparatus employed in forming a package in accordance with the two methods of this invention. Auxiliary devices such as idler rolls, sheet tensioning devices and other equipment of that nature which are conventional in forming packages from sheet material, illustrated more extensively in U.S. Patent 2,742,080, may be added but do not constitute any of the novel features of this invention. They are here omitted in the interest of clarity and brevity.

Referring now to the apparatus of FIGURE 1, by means of which the package of FIGURES 5 and 6 is manufactured, sheets or webs 11 and 12 of equal width are continuously drawn from rolls 13 and 14 into face-to-face position with their edges in register over the roll 15, thence over the drum 16. As the webs leave drum 16 they are separated to pass above and below a table generally indicated as 17, supported rigidly by bracket 18 on a rod 19.

As shown in FIGURES 3 and 4, table 17 is formed of two plates 20 and 21, the latter being of lesser area, so that the end of the thin slicing blade 22 may extend through the lower sheet 12 as it slices that sheet. The blade 22 is fixed on a rotatable hub 23, positioned between two fixed collars 24 and 25. A spring 26, secured to arm 27 on the hub 23, resiliently holds the blade in operative position, permitting it to be retracted when the apparatus is being set up for operation.

As the sheets 11 and 12 embrace and pass table 17, a narrow strip 28 is separated from the lower sheet 12, as shown in FIGURE 3, but continues to move along in an edge to edge relation with sheet 12, while sheets 11 and 12 are brought around the rotatable marginal heat sealer 29. The details of construction of this heat sealer are not a part of this invention, hence are not shown herein. It may be constructed in accordance with the marginal sealer 16 shown in FIGURE 6 of the aforesaid U.S. Patent 2,742,080.

The function of this heat sealer is to form the continuous marginal seal generally indicated as 31 in FIGURE 5 of this drawing and to seal the strip 28 to sheet 11. The roller 32 and another similar roller coact with the heated margins of sealer 29 to assure snug contact of the plastic sheets with each other and the margins of the sealer, and especially the strip 28 with sheet 11.

Instead of using the rotary marginal sealer 29, one may use a conventional reciprocating sealer, for which it would be necessary to stop travel of the webs temporarily to allow such a sealer to clamp the sheets together.

The sheets 11 and 12, with the packages partially formed therein, are next drawn over roller 33 and then are wrapped around a rotary transverse sealer 34, which may be constructed in accordance wth the transverse sealer shown in FIGS. 14 and 15 of the aforesaid U.S. Patent 2,742,080, issued to William S. Cloud, Sr. This sealer effects the forming of the double width, transversely extending heat seals 35 and 36 in FIGURE 5 herein.

Instead of using the transverse rotary sealer, the web may be stopped momentarily and a conventional reciprocating heat sealer may apply the transverse seals at proper intervals as the web moves step-by-step.

Thereafter, the sheets 11 and 12 are drawn through feed rolls 37 and 38 and, when they pass a conventional transverse rotary cutter 39, each package is severed from the sheets 11 and 12 preferably along the dotted lines 41 and 42 in the middle of the transverse seals. The individual packages then drop onto belts 43 and 44, to be delivered to a conveyor belt 45.

In FIGURE 5 the width of the slit opening 46 between plastic strip 28 and the remainder of sheet 12 is shown somewhat exaggerated for emphasis. This opening 46 is positioned somewhat inwardly from the edge of the package and adjacent the reinforced margin. When an air stream is employed to open the package, the reinforced area is not picked up by the air stream.

It is intended that after a product has been inserted into this package, a heat sealer applied to the sheets adjoining and inwardly of the opening 46 will then completely seal up the loaded package.

While the foregoing method of providing a reinforced edge and filler opening is preferred, another method is provided by this invention. Instead of starting with two plastic sheets of equal width, I may mount on the rolls 13 and 14, respectively, sheets 51 and 52 the latter being wide enough so that one of its margins may be folded over upon itself in the manner shown in FIGURE 7. To accomplish this, the slitting mechanism of FIGURE 3 is omitted from the package forming line and any conventional folding apparatus is substituted in place of the slitter.

For example, the folder 53 of FIGURE 8, with its accompanying guide plate 54, may be positioned in the line, as indicated in FIGURE 2. If desired, the sheet 52 may be scored by conventional means along the proposed fold line before folding. All the other operations of the line of equipment may be the same as described in connection with FIGURE 1. The reinforced and heat-sealed area 55 provides a reinforced edge adjoining the filler opening 56.

With either method, packages or pouches may be formed efficiently in a continuously moving operation and provided with reinforced filler openings which will contribute to the efficiency of the subsequent package filling operations.

Additionally, instead of forming the packages from two initially separate rolls of sheet material, as is indicated in FIGURES 1 and 2, I may employ a single roll on which is wound a single sheet previously folded along its longitudinal center line. One folded half after leaving the roll is operated on as is the web 11, the other half being operated on as is the web 12.

Starting from such a single roll, positioned as is the roll 13, for example, these two halves are together brought around a conventional tensioning roll 15, then together over the drum 16. Thereafter, the free edges of the top and bottom halves pass, one over and one under, the table 17 of the slitting device, and are operated on thereafter just as are the two webs 11 and 12.

Later, as these two halves pass around the marginal sealer 29, the marginal seal, corresponding to the seal 31 shown in FIGURE 6 of this drawing, is formed right along the previously folded edge and may include the fold itself.

Accordingly, where the claims hereinafter mention two webs, they refer not only to webs drawn from two independent rolls but also to the two halves drawn from a single roll having a sheet previously folded lengthwise as described.

While heat-sealing is shown and described herein, it should be understood that sealing with or without heat may be employed, and that adhesives and solvent seals may be applied to suitable kinds of sheet material in the forming of packages in accordance with this invention.

Adhesives may be utilized in the manner shown in the above mentioned Cloud patent. Sealing, as used in the appended claims, may refer to any kind of sealing which is suited to the purposes of this invention.

While rotary sealers are shown herein, any other sealing apparatus may be employed which will perform the required sealing.

Also, to meet some current or future commercial needs, each sheet or web may be laminated with one or more sheets of like or unlike material. But in any event, the webs will be operated on as herein described, whether laminated or not. Accordingly, where the claims hereinafter refer to webs, this term includes both single layer and multiple layer webs.

It should be understood that this invention is not limited to the exact details shown herein and described, but comprehends such changes, variations and modifications as fall within the scope of the claims appended hereto now or hereafter.

Having shown and described by invention, I claim:

1. A method of forming plastic heat-sealed packages comprising continuously introducing two elongated webs of heat-sealable plastic sheet material into a package forming equipment line, forming from one of the webs and superposing upon one running longitudinal edge portion of one web a narrow continuous strip of the same sheet material and maintaining the corresponding running edge of the other web adjacent but laterally of said strip and in the same plane therewith, maintaining the opposite running edges of both webs in registration, next, heat-sealing on a rotary marginal sealer the said strip to the first web and heat-sealing said opposite edges together, thereafter on a rotary transverse sealer heat-sealing the two webs together transversely of their widths at longitudinally spaced apart uniform intervals while leaving the aforesaid corresponding edge of the other web free and unsealed except at said transverse seals thereby defining with said strip a filling opening, and subsequently severing the webs transversely along the middle of each transverse seal successively to separate the completed packages.

2. A method of forming plastic heat-sealed packages comprising introducing elongated webs of equal width of heat-sealable plastic sheet material into a package forming equipment line in a continuous manner with all their running edges in mutual registration, longitudinally shearing a narrow strip from one running edge of one web as it advances but without substantial lateral displacement from either web, engaging said webs and strip with a rotary marginal heat-sealer and sealing the strip to an edge of the other web and leaving a free unsealed edge on said first web adjacent the sealed strip and in the same plane therewith, simultaneously sealing the opposite margins of the two webs together, thereafter on a rotary transverse sealer heat-sealing the two webs together transversely of their widths at intervals uniformly spaced apart longitudinally of the webs, and finally severing the webs along the middle of each transverse seal successively to separate completed packages with filling openings defined between said free edges and the opposite webs.

3. A method of forming plastic heat-sealed packages comprising introducing continuously into a package forming equipment line in face-to-face relation two elongated webs of unequal width of heat-sealable plastic sheet material, folding a narrow strip of the running longitudinal edge portion of the wider web inwardly upon said web to an extent just short of meeting the adjacent edge of the other web, contacting said webs with a rotary marginal heat-sealer and heat-sealing the folded strip to its own web without heat-sealing the said adjacent edge of the other web, simultaneously heat sealing together the margins of the two webs at the running edges opposite the first said running edge, thereafter on a rotary transverse sealer heat-sealing the two webs together transversely at longitudinally spaced apart uniform intervals, and finally severing the webs along the middle of each transverse seal successively to separate therefrom completed packages each having a filling opening defined by the first web and the unsealed aforesaid adjacent edge of the other web.

4. A method of forming sealable sheet material packages comprising introducing two webs of sealable sheet material into a package forming equipment line, forming from one of the webs and superposing upon one lateral longitudinal edge portion of one web a narrow continuous strip of said sheet material and maintaining the corresponding lateral edge of the other web adjacent but laterally of said strip and in the same plane therewith, maintaining the transversely opposite lateral edges of both webs in registration, sealing on a rotary marginal sealer the said strip to the first web and sealing said opposite edges together, thereafter on a rotary transverse sealer sealing the two webs together transversely at longitudinally spaced apart uniform intervals while leaving the aforesaid corresponding edge of the other web free and unsealed except at said transverse seals thereby defining with said strip a filling opening, and subsequently severing the webs transversely along the middle of each transverse seal to separate completed packages.

5. A method of forming packages comprising introducing two webs of equal width of sealable sheet material into a package forming equipment line with all their lateral edges in mutual registration, longitudinally shearing a narrow strip from one lateral edge of one web as it advances but without substantial lateral displacement relatively to either web, engaging said webs and the strip with a marginal sealer and sealing said strip to a lateral edge portion of the other web and leaving a free unsealed edge on the first web adjacent the sealed strip and in the same plane therewith, sealing the transversely opposite margins of the two webs together, thereafter on a transverse sealer sealing the two webs together transversely at intervals uniformly spaced apart longitudinally of the webs, and finally severing the webs along the middle of the transverse seals successively to separate completed packages with filling openings defined between said free edges and the sealed strips.

6. In an apparatus for forming packages from a pair of webs of sheet material, rotary storage means for the sheet material, means for sealing together the lateral margins of the two webs, means interposed between said margin sealer and the storage means adapted for longitudinally slitting a narrow strip of sheet material from the lateral longitudinal margin of one web, and means conveying the two webs of the sheet material from the storage means through said slitting means to effect said slitting action and further adapted to deliver both webs and the slit strip to the sealer without relative lateral displacement of the webs and the strip.

References Cited by the Examiner
UNITED STATES PATENTS

| | | | |
|---|---|---|---|
| 2,087,444 | 7/1937 | Potdevin | 93—8 |
| 2,237,327 | 4/1941 | Bell | 93—8 |
| 2,790,591 | 4/1957 | Rosen | 229—53.293 |
| 2,866,392 | 12/1958 | Scarvelis | 93—35 X |
| 2,873,566 | 2/1959 | Sylvester et al. | 93—35 X |
| 3,113,715 | 12/1963 | Pangrac | 229—53 |
| 3,125,006 | 3/1964 | Weicher et al. | 93—8 X |
| 3,147,674 | 9/1964 | Hoeppner | 93—35 |

BERNARD STICKNEY, *Primary Examiner.*

F. T. GARRETT, *Examiner.*

D. M. BOCKENEK, *Assistant Examiner.*